United States Patent [19]

Way, Jr.

[11] Patent Number: 4,890,513
[45] Date of Patent: Jan. 2, 1990

[54] VARIABLE SPEED TRANSMISSION

[76] Inventor: Lee V. Way, Jr., 1022 Kismet Dr., Aiken, S.C. 29801

[21] Appl. No.: 205,116

[22] Filed: Jun. 10, 1988

[51] Int. Cl.<sup>4</sup> ............ F16H 1/36; F16H 3/68; F16H 57/10
[52] U.S. Cl. .................... 74/781 R; 74/802
[58] Field of Search .......... 74/782, 783, 794, 793, 74/802, 674, 781 R

[56] References Cited

U.S. PATENT DOCUMENTS

| | | | |
|---|---|---|---|
| 1,118,616 | 11/1914 | Apple | 74/781 R |
| 1,864,870 | 6/1932 | Stoker | 74/781 R |
| 2,126,662 | 8/1938 | Ramsey | 74/783 |
| 2,366,063 | 12/1944 | Seybold | 74/783 X |
| 3,163,056 | 12/1964 | Clarke | 74/793 X |
| 3,447,400 | 6/1969 | Serniuk | 74/782 |
| 3,540,296 | 11/1970 | Hostutler | 74/782 X |
| 3,656,363 | 4/1972 | Defontenay | 74/394 |
| 3,712,153 | 1/1973 | East et al. | 74/687 |
| 4,189,962 | 2/1980 | Chung | 74/802 |
| 4,191,070 | 3/1980 | McKinniss | 74/682 |
| 4,295,391 | 10/1981 | Philpott et al. | 74/782 |
| 4,307,629 | 12/1981 | Moller | 74/802 X |
| 4,393,731 | 7/1983 | Croswhite et al. | 74/689 |
| 4,406,178 | 9/1983 | Gillade | 74/689 |
| 4,579,019 | 4/1986 | Gabriele | 74/682 |
| 4,587,866 | 5/1986 | Kraus | 74/691 |
| 4,651,592 | 3/1987 | Edwards | 74/689 |
| 4,671,134 | 6/1987 | Luo | 74/689 |
| 4,729,261 | 3/1988 | Tervola | 74/782 X |

FOREIGN PATENT DOCUMENTS

| | | | |
|---|---|---|---|
| 961176 | 5/1950 | France | 74/782 |
| 478223 | 5/1937 | United Kingdom | 74/783 |

*Primary Examiner*—Dwight G. Diehl
*Attorney, Agent, or Firm*—Steven J. Hultquist

[57] ABSTRACT

A variable speed transmission includes an input shaft, an output shaft and a holding shaft. A planetary gearing assembly is connected to the output shaft and holding shaft inside a rotatable drum. The input shaft is in communication with the rotatable drum. A brake assembly is mounted adjacent the holding shaft and actuated to selectively vary the rotational speed of the output shaft.

14 Claims, 6 Drawing Sheets

VARIABLE SPEED TRANSMISSION

BACKGROUND OF THE INVENTION

1. Field of the Invention

The present invention relates generally to variable speed transmissions. In particular, the present transmission includes a holding shaft and an apparatus for controlling its rotation to selectively vary the speed of the output shaft.

2. Description of the Related Art

Variable speed transmissions are well-known in the art. Generally, many transmissions include a gearing assembly for transferring the rotational speed of a constant speed input shaft to an output shaft of selectively variable speed. The gearing assembly may include a plurality of sun gears and planetary gears.

U.S. Pat. No. 3,656,363 issued to Defontenay discloses an apparatus for producing intermittent motion. An electric motor is mounted on a frame. A pulley is mounted on the motor shaft and rotates a differential housing inside the frame. A cam follower is in communication with a cam mounted on the housing. The cam follower, having rollers and a gear rack, reciprocates inside the frame. A pinion gear mated to the gear rack of the cam follower is mounted on the same shaft as a first sun gear, which drives a second sun gear through planetary gears. A gear is mated to an output gear and drive output rollers.

U.S. Pat. No. 4,191,070 issued to McKinnis discloses a transmission having a planetary gearing system. A steady-state power source drives an input shaft. Gear arrangements are provided between the input and output shafts. The output shaft is driven and accelerated as a function of a retardation which is supplied to the gear arrangement between the input and output shafts.

It is desirable that a variable speed transmission utilize a constant-speed input source and produce a selectively variable output shaft. Furthermore, it is desirable that a transmission include an apparatus for efficiently and easily varying the speed of the output shaft. It is desirable that a transmission be adaptable to automotive uses as well as other applications.

SUMMARY OF THE INVENTION

The present invention includes a variable speed transmission. The transmission receives a constant speed input source and provides an apparatus for controlling the rotation of a holding shaft to produce a desired speed at an output shaft. While the present transmission is particularly useful in automotive applications, it can be easily adapted for other uses, including a start-up mechanism for use with rotors of electrical motors.

The present invention is a variable speed transmission having an input shaft, an output shaft and a holding shaft. A planetary gearing assembly is connected to the output shaft and holding shaft inside a rotatable drum. The input shaft is in communication with the rotatable drum. A brake assembly is mounted adjacent the holding shaft and actuated to selectively vary the rotational speed of the output shaft.

In various embodiments, a pump assembly and a worm gear drive assembly can be utilized independently or in combination with the brake assembly to selectively vary the speed of the output shaft.

DETAILED DESCRIPTION OF THE PREFERRED EMBODIMENT

Figure 1:
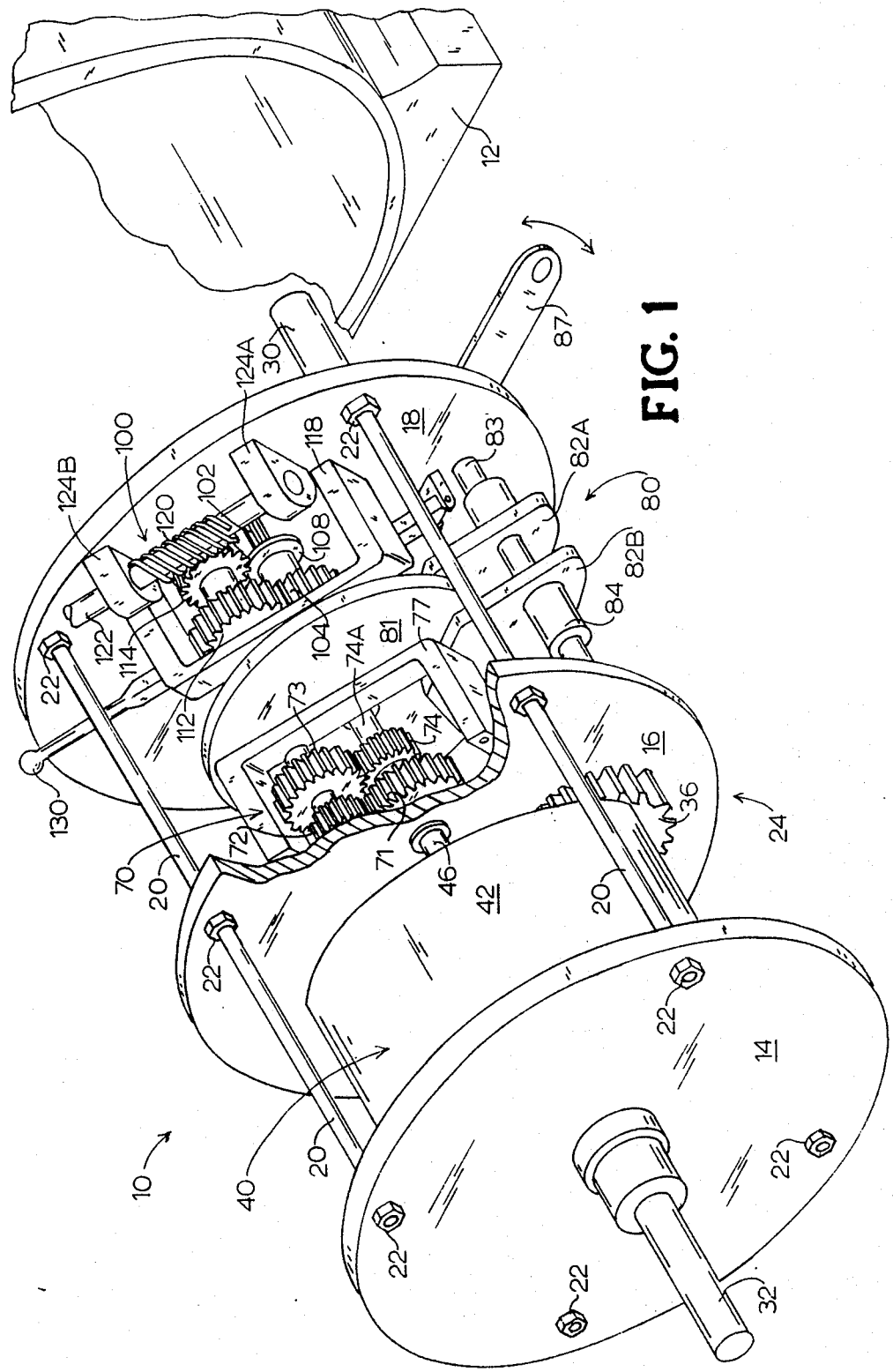
FIG. 1 is a perspective view of a preferred embodiment of the present variable speed transmission, exploded away from a housing for purposes of clarity of illustration.

A variable speed transmission, indicated generally at 10, is illustrated in FIGS. 1-4. The transmission 10 can be constructed and arranged to fit inside an outer housing 12. It is preferred that outer housing 12 be cylindrical and constructed from a durable and lightweight material.

Transmission 10 includes a first end disk 14, a central disk 16 and a second end disk 18. Disks 14, 16 and 18 are connected by threaded rods 20 and nuts 22. Disks 14, 16 and 18 and rods 20 form a longitudinal frame assembly, indicated generally at 24, for supporting the other elements of the transmission 10 described below. Of course, any suitable components and fasteners can be utilized to form the longitudinal transmission frame assembly 24.

Transmission 10 includes an input shaft 30 and an output shaft 32. Input shaft 30 can be conventionally connected to any desired source of constant or variable speed rotary power. Transmission 10 produces a selectively variable output rotation for output shaft 32 as described below.

Figure 3:
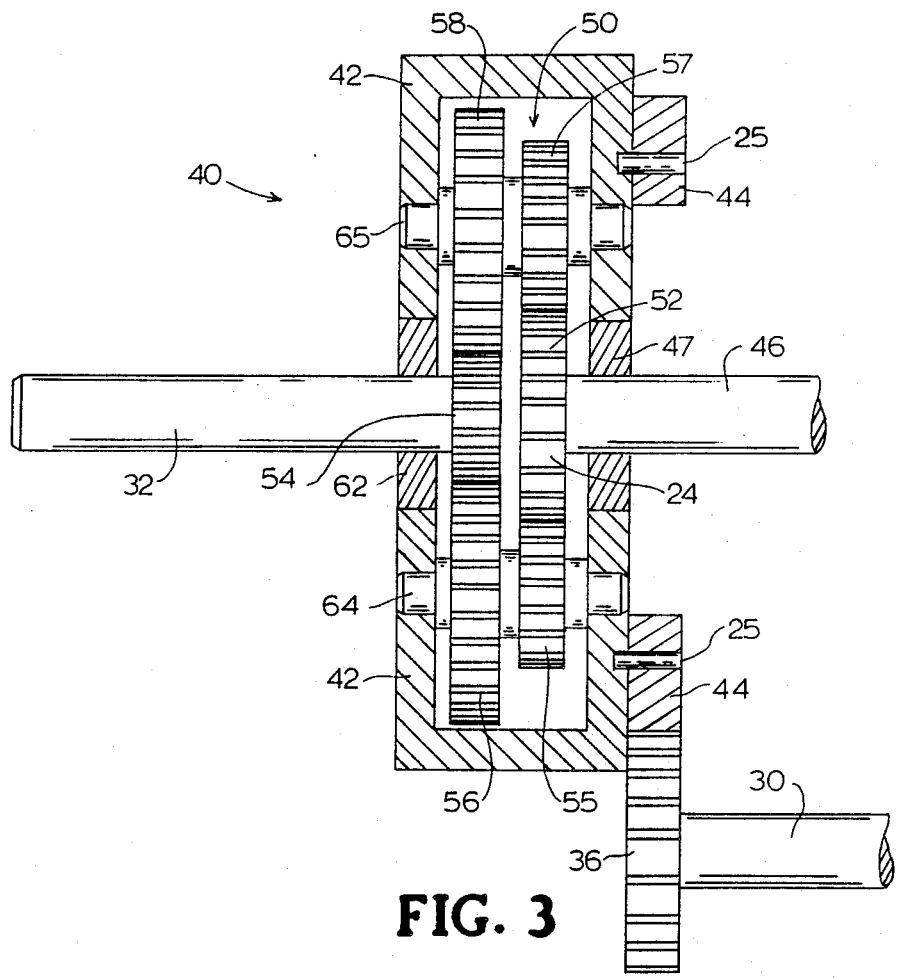
FIG. 3 is a sectional view through the rotating drum of the transmission of FIGS. 1 and 2 illustrating the planetary gearing assembly.
Figure 4:
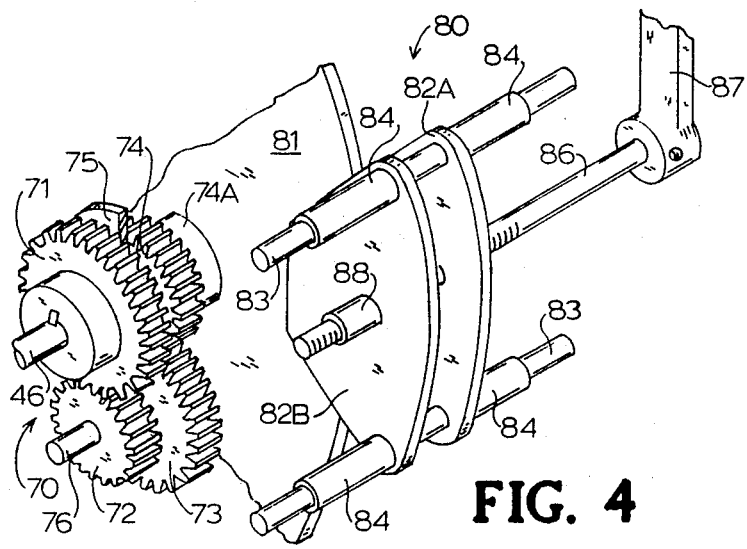
FIG. 4 is a fragmentary perspective view of the mechanical brake assembly of the transmission of FIGS. 1 and 2.

Between disks 14 and 16, a rotating drum assembly 40, illustrated best in the sectional view of FIG. 3, is in communication with the input shaft 30. Drum assembly 40 includes a rotating housing or drum 42 and a planetary gearing assembly 50.

Figure 2:
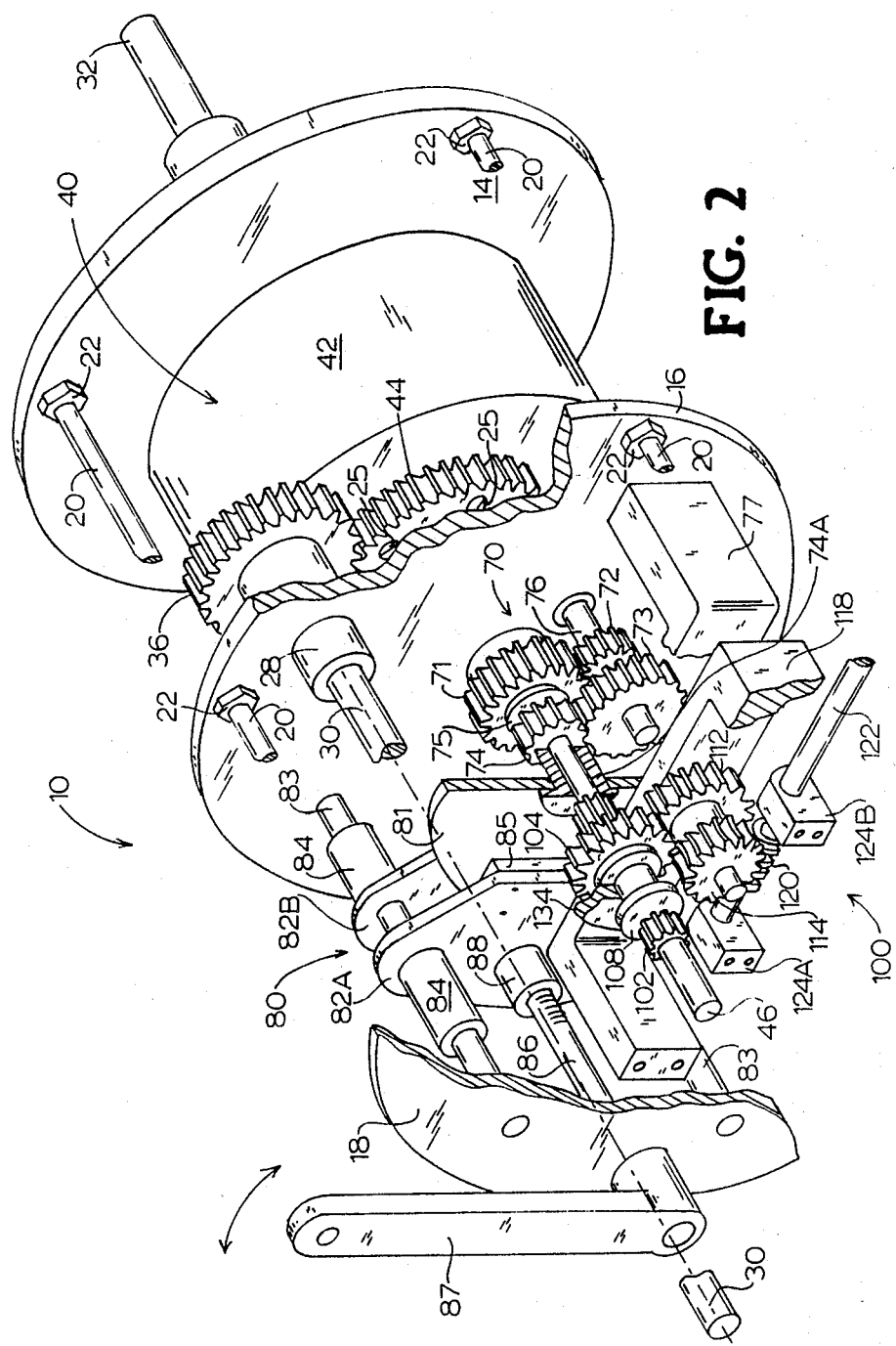
FIG. 2 is a fragmentary reverse perspective view of the transmission of FIG. 1 wherein a worm gear drive assembly has been removed for purposes of clarity of illustration.

A gear element 44 is mounted to an outer surface of drum 42 by any suitable means, e.g., welding or threaded fasteners 25 as illustrated in FIGS. 2 and 3. Input shaft 30 is received in bearings (not illustrated) of disks 16 and 18 and mounts a gear 36. Gear 36 is matingly engaged with gear element 44. Input shaft 30 is driven by any suitable power source, e.g. a constant speed motor (not illustrated). As input shaft 30 is rotated, gear 36 drives gear element 44 to rotate drum 42.

Drum 42 mounts a rotatable holding shaft 46. Holding shaft 46 is received in bearing 47 mounted in drum 42 and extends beyond central disk 16.

A planetary gearing assembly 50 is provided inside the drum 42. A first sun gear 52 is mounted on holding shaft 46. Sun gear 52 drives a second sun gear 54 through planet gears 55, 56 and 57, 58. Output shaft 32 is received in bearing 62 and mounts sun gear 54.

It is preferred that planet gears 55, 56 be formed as an integral member and be pivotally mounted on pin 64 mounted inside drum 42. In a similar manner, it is preferred that planet gears 57, 58 be formed as an integral member and be pivotally mounted on pin 65 mounted inside drum 42. It will be understood that planetary gearing assembly 50 can be constructed in an alternate embodiment so that first sun gear 52 drives second sun gear 54 through only one pair of planet gears.

It is preferred that the gearing ratios for the planetary gearing assembly 50 be such that the output shaft 32 rotates in the opposite direction of drum 42. In the embodiment illustrated in FIG. 3, a 2:1 ratio is provided between sun gear 52 and sun gear 54. It will be understood that other gearing ratios can be utilized with the planetary gearing assembly 50 to achieve the desired rotational directions of the output shaft 32 and the holding shaft 46.

Holding shaft 46 extends beyond drum 42 and through central disk 16. Holding shaft 46 is connected by gear train 70 to a brake assembly 80. As described below, brake assembly 80 controls the rotation of the holding shaft 46, thereby producing a desired rotation of output shaft 32.

Gear train 70 includes gears 71, 72, 73 and 74. Gear 71 is keyed to holding shaft 46 and acts as a holding gear. Gear 72 is matingly engaged to holding gear 71. Gears 72 and 73 are positioned apart from each other with a suitable space between them to accommodate thrust washer 75. Thrust washer 75 is mounted to gear 74 about holding shaft 46 and is accommodated by the space provided between gears 72 and 73. Gears 72 and 73 are fixed on and rotate with shaft 76 which is supported by central disk 16 and support 77. Support 77, preferably a U-shaped member, is secured to central disk 16 by any suitable means, e.g. mechanical fasteners (not illustrated). Gear 73 is matingly engaged with gear 74. A tubular portion 74A includes a central opening for receiving holding shaft 46. Tubular portion 74A is fixed to gear 74. Gear 74 and tubular portion 74A are freely mounted on holding shaft 46 and driven by gear 73. Gear train 70 transfers the rotation of holding shaft 46 to gear 74 through gears 71, 72 and 73.

Brake assembly 80, mounted on frame assembly 24 between disks 16 and 18, includes a control or braking disk 81. Braking disk 81 is fixedly mounted on tubular portion 74A. Braking disk 81 rotates with tubular portion 74A whenever gear 74 is driven by gear 73.

Clamp plates 82A and 82B, each having a brake pad 85, are mounted on support rods 83 so that braking disk 81 is received between the brake pads 85. Guides 84 are mounted on rods 83. Clamp plates 82A and 82B are activated by threaded rod 86 and lever 87. Guides 88 are threaded on rod 86 on each side of clamp plates 82A and 82B opposite brake pads 85. As lever 87 is rotated, clamped plates 82A and 82B are forced toward one another until brake pads 85 contact braking disk 81. When clamp plates 82A and 82B are closed, the braking disk 81 is held in place, thereby preventing rotation of tubular portion 74A and gear 74. Whenever gear 74 is held, gear train 70 prevents rotation of holding gear 71 and holding shaft 46. Whenever holding shaft 46 is held, the rotation of output shaft 32 is increased by planetary gearing assembly 50. As the rotation of braking disk 81 is controlled by clamp plates 82A and 82B, a selected rotation of output shaft 32 can be achieved.

It will be understood that braking disk 81 can be fixedly mounted on holding shaft 46 and gear train 70 eliminated from the transmission 10. Clamp plates 82A and 82B can be utilized to control the rotation of braking disk 81 and holding shaft 46, thereby varying the rotation of output shaft 32. However, in such an embodiment of the present invention, the mechanical advantage provided by gear train 70 would not be available. Thus, the torque required to hold braking disk 81 would increase relative to the gear ratio eliminated.

Figure 5:
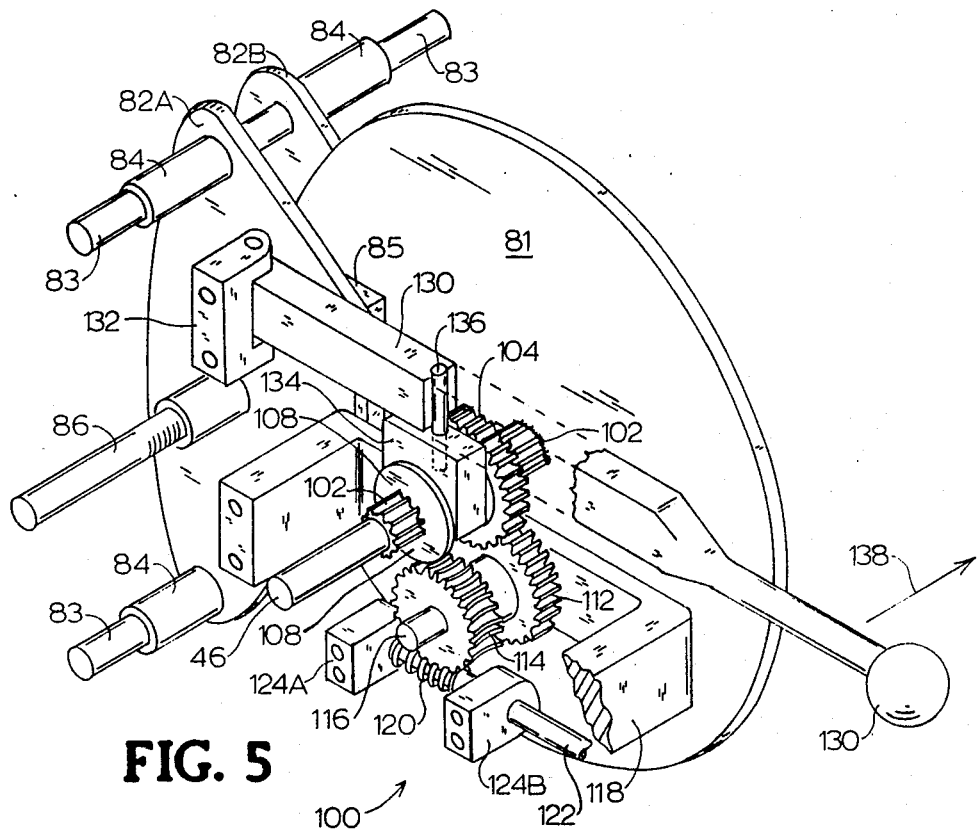
FIG. 5 is a perspective view of the worm gear drive assembly of the transmission of FIGS. 1 and 2 illustrated in a disengaged position.
Figure 6:
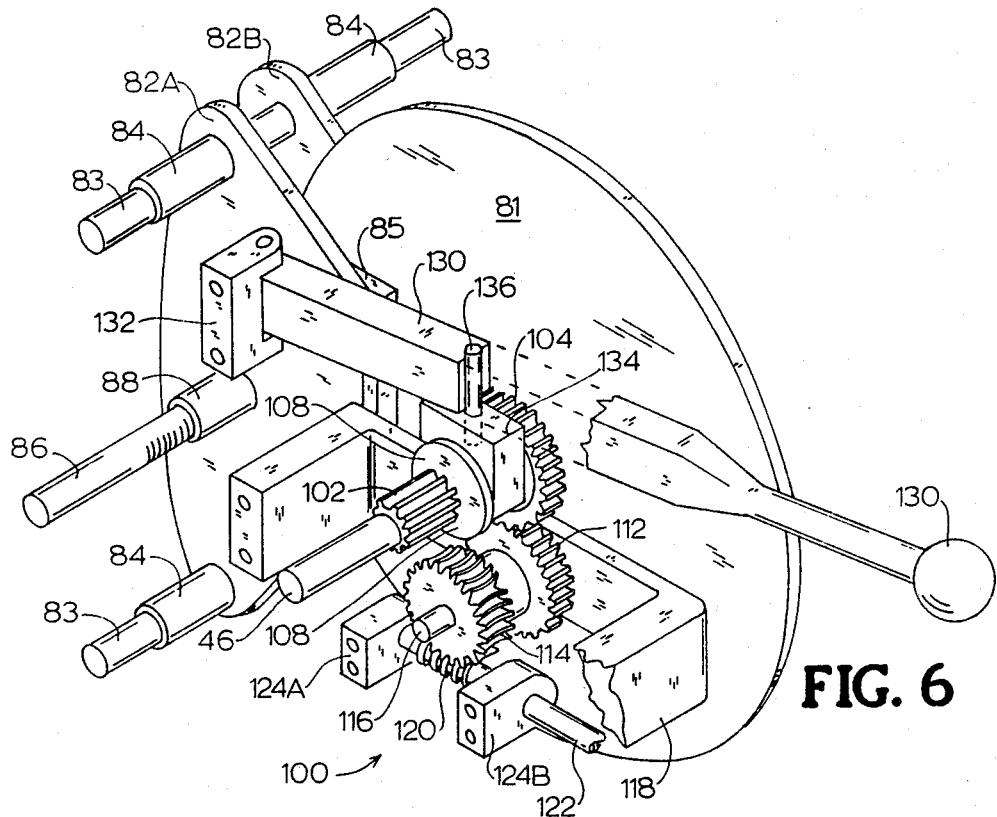
FIG. 6 is a perspective view of the worm gear drive assembly of FIG. 5 illustrated in the engaged position.

A worm gear drive assembly 100 provides an additional means for retarding and preventing the rotation of the holding shaft 46, thereby selectively varying the rotation of the output shaft 32. Worm gear drive assembly 100, illustrated best in FIGS. 5 & 6, is mounted on the frame assembly 24 between the braking disk 81 and the second end disk 18.

A splined hollow shaft 102, is freely mounted on holding shaft 46 and fixedly secured to braking disk 81 and/or tubular portion 74A. Splined shaft 102 freely rotates about holding shaft 46 with braking disk 81, tubular portion 74A and gear 74. Gear 104 and throwout bearing 108 are mounted on shaft 102. As described below, shifting block 134 is mounted on throwout bearing 108.

Gears 112 and 114 are spaced apart and mounted on shaft 116. Shaft 116 is rotatably supported by support 118 and second disk 18. It is preferred that support 118 be a U-shaped member fixed to second end disk 18 by any suitable means, e.g. fasteners (not illustrated).

A worm gear 120 is mounted on rod 122 and rotatably supported by supports 124A and 124B. Suppots 124A and 124B are mounted on second end disk 18 by any suitable means, e.g. fasteners (not illustrated). Worm gear 120 is matingly engaged with gear 114.

To engage worm gear drive assembly 100, gear 104 is axially slid on splined shaft 102 by lever 130. Lever 130 is pivotally connected to second end disk 18 by bracket 132. Lever 130 includes shifting block 134 connected to lever 130 by pin 136. Shifting block 134 is received in a space provided between throwout bearing 108 and gear 104.

The worm gear drive assembly 100 is illustrated in the "open" or disengaged position in FIG. 5. In the disengaged position, gear 104 is positioned in the space between gears 112 and 114. When drive assembly 100 is disengaged, splined shaft 102, gear 104 and braking disk 81 rotate freely about holding shaft 46. In the "closed" or engaged position illustrated in FIG. 6, gear 104 is slid on shaft 102 toward the braking disk 81, as indicated by arrow 138, by shifting block 134 and lever 130 so that gear 104 is matingly engaged with gear 112. When engaged, the worm gear 120 can be controlled by rotation of rod 122 to slow and/or holding braking disk 81. As described above, retardation of the braking disk 81 slows the rotation of gear train 70, thereby varying the rotation of output shaft 32.

Figure 7:
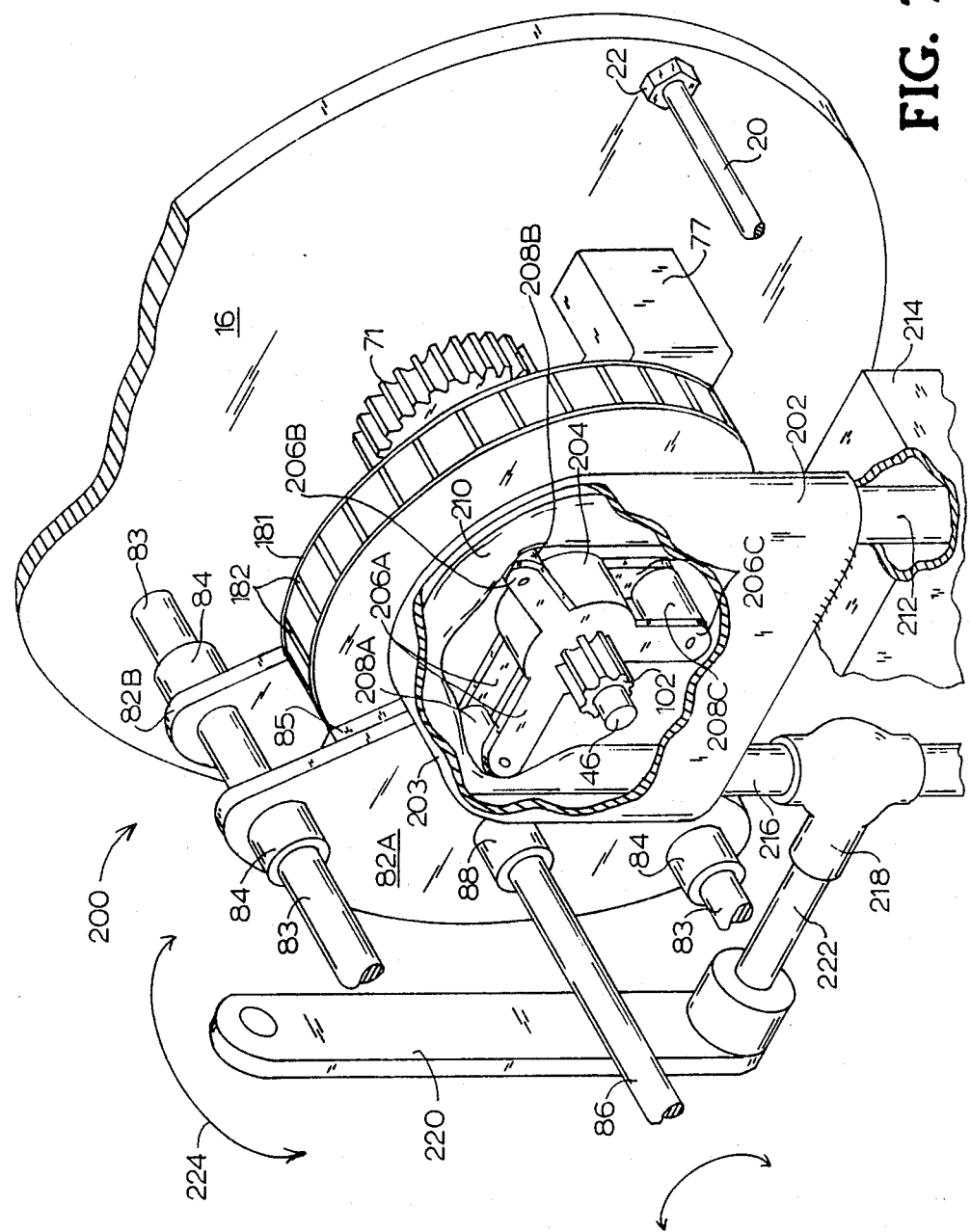
FIG. 7 is a perspective view of an alternate pump assembly utilized as an alternate to the worm gear assembly for controlling the speed of the transmission holding shaft.

As an alternative to the worm gear drive assembly 100, a pump assembly, indicated generally at 200 and illustrated in FIG. 7, can be installed on the transmission 10. For purposes of clarity, all reference numerals between 200 and 224 are used to indicate elements associated with the pump assembly 200.

A control disk 181 having spacers 182 for cooling about its periphery is mounted on tubular portion 74A and gear 74 and rotates about holding shaft 46. Control disk 181 is inserted between brake pads 85 of brake assembly 80 and is illustrated as an alternate to braking disk 81. It will be understood that control disk 181 and braking disk 81 are interchangable.

A housing 202 encloses a pump rotor 204. It is preferred that housing 202 include at least one rounded end portion 203 as illustrated in FIG. 7. Rotor 204 includes a central, splined opening complementary to splined shaft 102. Rotor 204 is mounted on and secured to splined shaft 102 so that rotor 204 and shaft 102 rotate together.

In a preferred embodiment, rotor 204 includes arm assemblies 206A, 206B and 206C positioned approximately 120° from one another about the central opening of the rotor 204. Each arm assembly 206A, 206B and 206C mounts a rotatable compression roller 208A, 208B, 208C. A flexible tube 210 is wrapped around rotor 204 inside the housing 202 so that the tube 210 engages and is supported by rollers 208A, 208B and 208C. It is preferred that tube 210 forms a U-shape in the rounded end portion 203 of housing 202.

Tube 210 includes an inlet portion 212 which is in communication with a fluid reservoir 214. Reservoir 214 can be provided adjacent transmission 10. Alternatively, inlet portion 212 can be in communication with an existing fluid reservoir, e.g. the reservoir of an automobile.

At an opposite end of tube 210, an outlet portion 216 returns fluid in the tube to reservoir 214. Between pump housing 202 and the reservoir 214, a flow control valve 218 is provided in outlet portion 216. Valve 218 is operated by lever 220 connected by rod 222 to valve 218. Lever 220 is rotated as indicated by arrow 224.

In operation, valve 218 is opened so that fluid flows from the inlet portion 212 to the outlet portion 216 of tube 210 so that rollers 208A, 208B and 208C freely rotate as rotor 204 rotates with splined shaft 102. When the valve 218 is opened, holding shaft 46 rotates freely, thereby decreasing the rotation of the output shaft 32.

To increase the speed of the output shaft 32, lever 220 is rotated to close valve 218 and reduce fluid flow through tube 210. As fluid flow is reduced, tube 210 deflates and back pressure in tube 210 slows rotation by providing a resistance to the rotation of rotor 204 through rollers 208A, 208B and 208C.

When valve 218 is closed, no fluid is pumped by the pump assembly 200 and splined shaft 102 is prevented from rotating, thereby stopping control disk 181. When control disk 181 is stopped, thereby preventing rotation of gear 74, output shaft 32 rotates at full speed. The more valve 218 is opened, the faster control disk 181 is permitted to rotate, thereby slowing the rotation of output shaft 32. Thus, pump assembly 200 provides an apparatus for precisely controlling the speed of output shaft 32 without generating excessive heat. Heat is transferred by the fluid traveling in tube 210 to the fluid reservoir 214.

Of course, many variations of pump assembly 200 can be envisioned. The pump assembly 200 can include any positive displacement pump, in particular, a radial-type positive displacement pump, or any other suitable pump design. In FIG. 7, rotor 204 is shown as a separate element secured to splined shaft 102. Alternatively, the pump rotor can be made as an integral member connected to control disk 181. Various techniques can be employed with or substituted for flow control valve 218, including semiconductors and other electromechanical control devices.

It will be appreciated that pump assembly 200 can be used independently of or in combination with mechanical brake assembly 80 to control the rotation of control disk 181. Alternatively, it will be appreciated that pump assembly 200 having suitable splined portion can be utilized with worm gear drive assembly 100.

Figure 8:
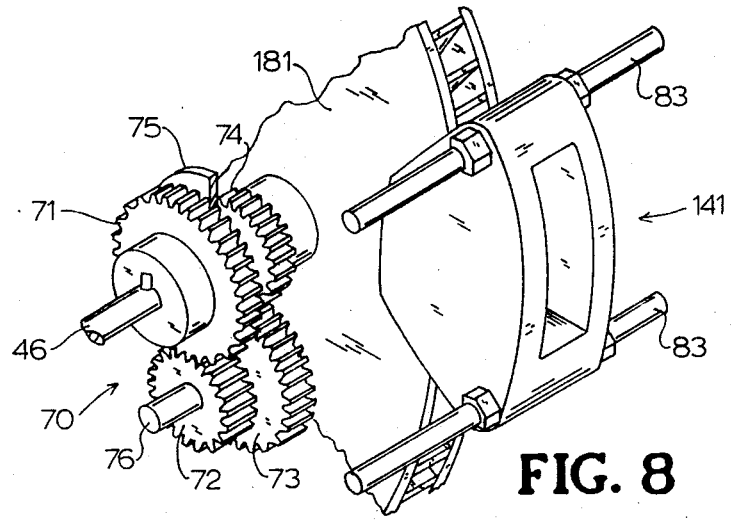
FIG. 8 is a fragmentary, perspective view of an alternate hydraulic clamp assembly for use with the transmission of FIGS. 1 and 2.
Figure 9:
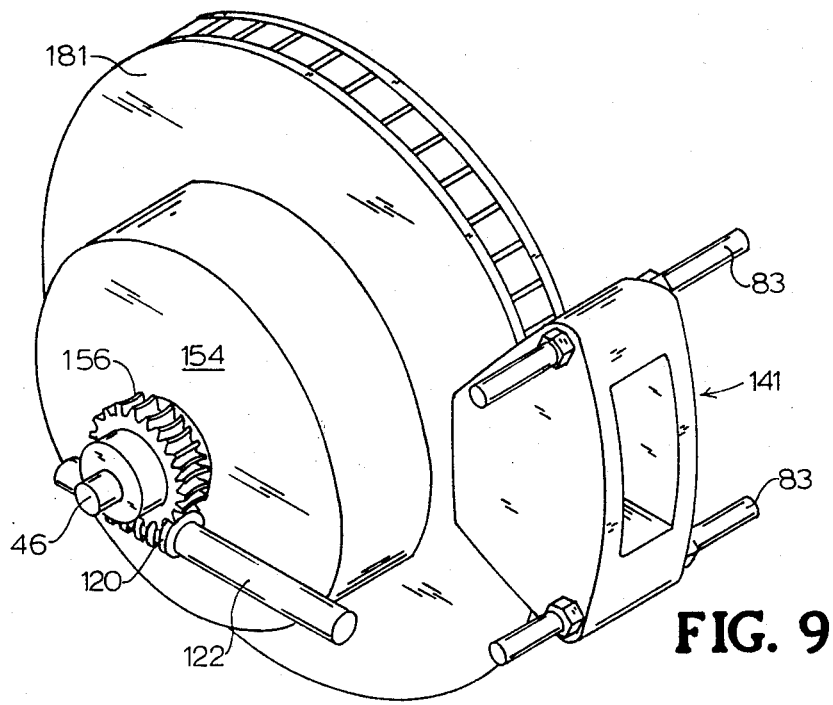
FIG. 9 is a perspective view of an alternate clutch assembly for engagement to the worm gear of the transmission of FIGS. 1 and 2.

As an alternative to the mechanical brake assembly 80, a hydraulic clamp assembly, indicated generally at 141 and illustrated in FIGS. 8 and 9, can be utilized to control the rotation of output control disk 181. Hydraulic clamp assembly 141 is supported by rods 83 between central disk 16 and second end disk 18. Hydraulic clamp assembly 141 includes brake pads (not illustrated) for engaging and holding control disk 181.

FIG. 9 illustrates a clutch assembly 154 connected to and driven by worm gear 120. Gear 156 is mounted on holding shaft 46 and matingly engaged to worm gear 120.

In operation, when the holding shaft 46 is held, the output shaft 32 rotates in a direction opposite the rotation of drum 42 and rotates the same direction as input shaft 30. When the holding shaft 46 is free to rotate, the holding shaft 46 rotates opposite input shaft 30 and rotates the same direction as drum 42.

It will be appreciated that a computer or microprocessor, including software, can be utilized with the present transmission 10 to provide a selected rotation of output shaft 32. For example, a microprocessor can be employed with the mechanical brake assembly 80, worm gear assembly 100 or pump assembly 200 to actuate an assembly to retard and/or prevent the rotation of the holding shaft 46, resulting in a selected rotation of output shaft 32. Likewise, such a microprocessor can be utilized with pneumatic, magnetic, electromechanical or other forms of assemblies for retarding the rotation of holding shaft 46.

Although the present invention has been described with reference to a preferred embodiment, persons skilled in the art will recognize that changes may be made in form and detail without departing from the spirit and scope of the invention.

What is claimed is:

1. An apparatus for slowing the rotation of a holding shaft of a variable speed transmission, wherein the transmission includes a rotatable drum coupled in driven relationship with an input shaft, and a gearing assembly in the rotable drum connected to the holding shaft and output means, the apparatus comprising:
   (1) a first selectively actuatable means for slowing the rotation of the holding shaft, including:
      (a) a control disk fixedly mounted on the holding shaft; and
      (b) a clamp assembly adjacent the control disk and operable to close on the control disk, thereby slowing rotation of the holding shaft; and
   (2) a second selectively actuatable means for slowing the rotation of the holding shaft, including:
      (a) a rotor, mounted on the holding shaft, having means for rotatably supporting a flexible fluid-containing tube; and
      (b) valve means for controlling the flow of fluid through the tube, whereby the holding shaft rotation is slowed as the flow of fluid through the tube is reduced.

2. An apparatus for slowing the rotation of a holding shaft of a variable speed transmission, wherein the transmission includes a rotatable drum coupled in driven relationship with an input shaft, and a gearing assembly in the rotatable drum connected to the holding shaft and output means, the apparatus comprising:
   (1) a first selectively actuable means for slowing the rotation of the holding shaft, including:
      (a) a control disk fixedly mounted on the holding shaft; and
      (b) a clamp assembly adjacent the control disk and operable to close on the control disk, thereby slowing rotation of the holding shaft; and
   (2) a second selectively actuable means for slowing the rotation of the holding shaft, including:
      (a) a gear train selectively connected to the holding shaft; and
      (b) a worm gear connected to the gear train.

3. A variable speed transmission, comprising:
   (a) a cylindrical drum rotatable about its central axis, said drum including planar first and second main circular faces, axially spaced apart from one another and joined to each other by a cylindrical peripheral wall, to form an enclosed interior volume in the drum;
   (b) a first gear element mounted on an outer surface of the drum;
   (c) a rotatable input shaft having a longitudinal axis parallel to the central axis of said drum;
   (d) a gear mounted on the input shaft and engaging the first gear element (b) to effect rotation of the drum upon rotation of the input shaft;
   (e) a holding shaft extending into the interior volume of the drum, and having a longitudinal axis coaxial with the central axis of the drum;
   (f) a first sun gear mounted on said holding shaft in the interior volume of the drum;
   (g) a planetary gear assembly mounted in the interior volume of the drum, comprising a first planet gear engaging the first sun gear, and a second planet gear axially spaced from the first planet gear and coaxially mounted therewith on a common shaft for integral rotation of the first and second planet gears with the common shaft;
   (h) a rotatable output shaft extending into the interior volume of the drum opposedly to said holding shaft, and having a longitudinal axis coaxial with the central axis of the drum and colinear with the longitudinal axis of the holding shaft;
   (i) a second sun gear mounted on the output shaft in the interior volume of the drum, in axial spaced relationship to the first sun gear, and engaging the second planet gear, with the second sun gear and the first sun gear being of different size to provide a gearing ratio such that the output shaft rotates in an opposite direction of rotation to the drum;
   a first selectively engageable shaft holding means for slowing the rotation of said holding shaft, said first selectively engageable shaft holding means comprising:
   (j) a control disk mounted on the holding shaft, arranged to rotate with the holding shaft when the rotation of the control disk is unimpeded, and to correspondingly slow or stop the rotation of the holding shaft when the control disk is slowed or stopped, such that when the holding shaft is stopped, the output shaft rotates in a direction opposite the rotation of the drum and rotates in the same direction as the input shaft, and when the holding shaft unimpededly rotates, the holding shaft rotates in a direction opposite the rotation of the input shaft and in the same direction as the drum; and
   (k) means for selectively braking the control disk to correspondingly slow or stop the holding shaft, such that when the control disk and the holding shaft are stopped, the output shaft rotates at full speed, and with increasing speed of rotation of the control disk correspondingly slowing the rotation of the output shaft; and
   a second selectively engageable shaft holding means for slowing the rotation of said holding shaft.

4. A variable speed transmission according to claim 3, wherein said first gear element is mounted on an outer surface of a said main circular face of the drum through which the holding shaft extends into the interior volume of the drum, such that the first gear element circumscribes the holding shaft on said main circular face of the drum.

5. A variable speed transmission according to claim 3, characterized by a gear ratio of the first sun gear to the second sun gear of 2:1.

6. A variable speed transmission according to claim 3, wherein the means for selectively braking the control disk comprise a clamping assembly for selectively clamping the control disk to slow or stop the control disk and the holding shaft.

7. A variable speed transmission, comprising:
   (a) a cylindrical drum rotatable about its central axis, said drum including planar first and second main circular faces, axially spaced apart from one another and joined to each other by a cylindrical peripheral wall, to form an enclosed interior volume in the drum;
   (b) a first gear element mounted on an outer surface of the drum;
   (d) a gear mounted on the ouput shaft and engaging the first gear element (b) to effect rotation of the drum upon rotation of the input shaft;
   (e) a holding shaft extending into the interior volume of the drum, and having a longitudinal axis coaxial with the central axis of the drum;
   (f) a first sun gear mounted on said holding shaft in the interior volume of the drum;
   (g) a planetary gear assembly mounted in the interior volume of the drum, comprising a first planet gear engaging the first sun gear, and a second planet gear axially spaced from the first planet gear and coaxially mounted therewith on a common shaft for integral rotation of the first and second planet gears with the common shaft;
   (h) a rotatable output shaft extending into the interior volume of the drum opposedly to said holding shaft, and having a longitudinal axis coaxial with the central axis of the drum and colinear with the longitudinal axis of the holding shaft;
   (i) a second sun gear mounted on the output shaft in the interior volume of the drum, in axial spaced relationship to the first sun gear, and engaging the second planet gear, with the second sun gear and the first sun gear being of differing size to provide a gearing ratio such that the output shaft rotation in an opposite direction of rotation of the drum;

(j) a control disk mounted on the holding shaft, arranged to rotate with the holding shaft when the rotation of the control disk is unimpeded, and to correspondingly slow or stop the rotation of the holding shaft when the control disk is slowed or stopped, such that when the holding shaft is stopped, the output shaft rotates in a direction opposite the rotation of the drum and rotates in the same direction as the input shaft, and when the holding shaft unimpededly rotates, the holding shaft rotates in a direction opposite the rotation of the input shaft and in the same direction as the drum; and (k) means for selectively braking the control disk to correspondingly slow or stop the holding shaft, such that when the control disk and the holding shaft are stopped, the output shaft rotates at full speed, and with increasing speed of rotation of the control disk correspondingly slowing the rotation of the output shaft, said means comprising a gear train associated with said holding shaft, including a holding gear secured to the holding shaft, a second gear freely rotatably mounted on the holding shaft and connected to the control disk for integral rotation therewith, a rotatable gear train shaft having a longitudinal axis parallel to the longitudinal axis of the holding shaft, a third gear secured to the gear train shaft and engaging the holding gear, and a fourth gear secured to the gear train shaft in axial spaced relationship to the third gear and engaging the second gear, whereby the gear train transfers rotation of the holding shaft to the second gear through the holding gear, the third gear, and fourth gear, and when the second gear is held, the gear train prevents rotation of the holding gear and holding shaft.

8. A variable speed transmission, comprising:
(a) a cylindrical drum rotatable about its central axis, said drum including planar first and second main circular faces, axially spaced apart from one another and joined to each other by a cylindrical peripheral wall, to form an enclosed interior volume in the drum;
(b) a first gear element mounted on an outer surface of the drum;
(c) a rotatable input shaft having a longitudinal axis parallel to the central axis of said drum;
(d) a gear mounted on the input shaft and engaging the first gear element (b) to effect rotation of the drum upon rotation of the input shaft;
(e) a holding shaft extending into the interior volume of the drum, and having a longitudinal axis coaxial with the central axis of the drum;
(f) a first sun gear mounted on said holding shaft in the interior volume of the drum;
(g) a planetary gear assembly mounted in the interior volume of the drum, comprising a first planet gear engaging the first sun gear, and a second planet gear axially spaced from the first planet gear and coaxially mounted therewith on a common shaft for integral rotation of the first and second planet gears with the common shaft;
(h) a rotatable output shaft extending into the interior volume of the drum opposedly to said holding shaft, and having a longitudinal axis coaxial with the central axis of the drum and colinear with the longitudinal axis of the holding shaft;
(i) a second sun gear mounted on the output shaft in the interior volume of the drum, in axial spaced relationship to the first sun gear, and engaging the second planet gear, with the second sun gear and the first sun gear being of differing size to provide a gearing ratio such that the output shaft rotates in an opposite direction of rotation to the drum;
(j) a control disk mounted on the holding shaft, arranged to rotate with the holding shaft when the rotation of the control disk is unimpeded, and to correspondingly slow or stop the rotation of the holding shaft when the control disk is slowed or stopped, such that when the holding shaft is stopped, the output shaft rotates in a direction opposite the rotation of the drum and rotates in the same direction as the input shaft, and when the holding shaft unimpededly rotates, the holding shaft rotates in a direction opposite the rotation of the input shaft and in the same direction as the drum; and
(k) means for selectively braking the control disk to correspondingly slow or stop the holding shaft, such that when the control disk and the holding shaft are stopped, the output shaft rotates at full speed, and with increasing speed of rotation of the control disk correspondingly slowing the rotation of the output shaft, wherein the means for selectively braking the control disk comprise:
  (i) a splined hollow shaft fixedly secured to the control disk and mounted on the holding shaft for free rotation thereon with the control disk, when the control disk is umimpededly rotating;
  (ii) an engagement gear mounted on the splined hollow shaft for axial translation therealong;
  (iii) positioning means for selectively positioning the engagement gear at a selected axial position on the splined hollow shaft;
  (iv) a rotatable shaft having a longitudinal axis parallel to the longitudinal axis of the holding shaft;
  (v) a first gear fixedly mounted on the shaft (iv) for rotation therewith;
  (vi) a second gear fixedly mounted on the shaft (iv) in axial spaced relationship to the first gear (v);
  (vii) a rod having a longitudinal axis oriented perpendicularly to the longitudinal axis of the shaft (iv);
  (viii) a worm gear mounted on the rod in engagement with the first gear (iv);
  (ix) the positioning means (iii) being selectively translatable between a first disengaged position in which the splined shaft, engagement gear, and control disk rotate freely about the holding shaft, and a second, engaged position in which the engagement gear is engaged with second gear (vi), such that in the second engaged position, the worm gear and rod are selectively rotatable to correspondingly slow or stop the rotation of the control disk.

9. A variable speed transmission, comprising:
(a) a cylindrical drum rotatable about its central axis, said drum including planar first and second main circular faces, axially spaced apart from one another and joined to each other by a cylindrical peripheral wall, to form an enclosed interior volume in the drum;
(b) a first gear element mounted on an outer surface of the drum;

(c) a rotatable input shaft having a longitudinal axis parallel to the central axis of said drum;
(d) a gear mounted on the input shaft and engaging the first gear element (b) to effect rotation of the drum upon rotation of the input shaft;
(e) a holding shaft extending into the interior volume of the drum, and having a longitudinal axis coaxial with the central axis of the drum;
(f) a first sun gear mounted on said holding shaft in the interior volume of the drum;
(g) a planetary gear assembly mounted in the interior volume of the drum, comprising a first planet gear engaging the first sun gear, and a second planet gear axially spaced from the first planet gear and coaxially mounted therewith on a common shaft for integral rotation of the first and second planet gears with the common shaft;
(h) a rotatable output shaft extending into the interior volume of the drum opposedly to said holding shaft, and having a longitudinal axis coaxial with the central axis of the drum and colinear with the longitudinal axis of the holding shaft;
(i) a second sun gear mounted on the output shaft in the interior volume of the drum, in axial spaced relationship to the first sun gear, and engaging the second planet gear, with the second sun gear and the first sun gear being of differing size to provide a gearing ratio such that the output shaft rotates in an opposite direction of rotation to the drum;
(j) a control disk mounted on the holding shaft, arranged to rotate with the holding shaft when the rotation of the control disk is unimpeded, and to correspondingly slow or stop the rotation of the holding shaft when the control disk is slowed or stopped, such that when the holding shaft is stopped, the output shaft rotates in a direction opposite the rotation of the drum and rotates in the same direction as the input shaft, and when the holding shaft unimpededly rotates, the holding shaft rotates in a direction opposite the rotation of the input shaft and in the same direction as the drum; and
(k) means for selectively braking the control disk to correspondingly slow or stop the holding shaft, such that when the control disk and the holding shaft are stopped, the output shaft rotates at full speed, and with increasing speed of rotation of the control disk correspondingly slowing the rotation of the output shaft, wherein the means for selectively braking the control disk comprise:
(i) a housing having the holding shaft extending into an interior volume thereof;
(ii) a splined shaft mounted on the holding shaft for rotation therewith;
(iii) a rotor mounted on and secured to the splined shaft for rotation therewith, the rotor mounting a series of peripheral rollers;
(iv) a flexible tube wrapped around the rotor in the housing so that the tube engages and is supported by the rollers, the tube defining inlet and outlet portions at its respective extremities;
(v) a fluid reservoir having the respective inlet and outlet portions of the tube in fluid flow communication therewith; and
(vi) a flow control valve for selectively varying fluid flow through the tube;
whereby (A) when the flow control valve is open, fluid is flowed through the tube from the inlet portion to the outlet portion thereof and the rotor, splined shaft, and holding shaft rotate, to thereby decrease the rotation of the output shaft, (B) partial closing of the flow control valve reduces fluid flow through the tube to slow rotation of the rotor, splined shaft, and holding shaft, and (C) when the flow control valve is fully closed, the rotor and splined shaft are prevented from rotating, and thereby stop the control disk, such that when the control disk is stopped, the output shaft rotates at full speed, and the greater the open character of the flow control valve, the faster the control disk is rotated, thereby correspondingly slowing the rotation of the output shaft.

10. A variable speed transmission according to claim 9, further comprising selective clamping means for independently or concurrently controlling rotation of the control disk.

11. A variable speed transmission according to claim 10, wherein the selective clamping means comprise mechanical clamping means.

12. A variable speed transmission according to claim 10, wherein the selective clamping means comprise hydraulic clamping means.

13. A variable speed transmission, comprising:
(a) a cylindrical drum rotatable about its central axis, said drum including planar first and second main circular faces, axially spaced apart from one another and joined to each other by a cylindrical peripheral wall, to form an enclosed interior volume in the drum;
(b) a first gear element mounted on an outer surface of the drum;
(c) a rotatable input shaft having a longitudinal axia parallel to the central axis of said drum;
(d) a gear mounted on the input shaft and engaging the first gear element (b) to effect rotation of the drum upon rotation of the input shaft;
(e) a holding shaft extending into the interior volume of the drum, and having a longitudinal axis coaxial with the central axis of the drum;
(f) a first sun gear mounted on said holding shaft in the interior volume of the drum;
(g) a planetary gear assembly mounted in the interior volume of the drum, comprising a first planet gear engaging the first sun gear, and a second planet gear axially spaced from the first planet gear and coaxially mounted therewith on a common shaft for integral rotation of the first and second planet gears with the common shaft;
(h) a rotatable output shaft extending into the interior volume of the drum opposedly to said holding shaft, and having a longitudinal axis coaxial with the central axis of the drum and colinear with the longitudinal axis of the holding shaft;
(i) a second sun gear mounted on the output shaft in the interior volume of the drum, in axial spaced relationship to the first sun gear, and engaging the second planet gear, with the second sun gear and the first sun gear being of differing size to provide a gearing ratio such that the output shaft rotates in an opposite direction of rotation to the drum;
(j) a control disk mounted on the holding shaft, arranged to rotate with the holding shaft when the rotation of the control disk is unimpeded, and to correspondingly slow or stop the rotation of the holding shaft when the control disk is slowed or stopped, such that when the holding shaft is stopped, the output shaft rotates in a direction opposite the rotation of the drum and rotates in the same direction as the input shaft, and when the holding shaft unimpededly rotates, the holding shaft rotates in a direction opposite the rotation of the input shaft and in the same direction as the drum; and (k) means for selectively braking the control disk to correspondingly slow or stop the holding shaft, such that when the control disk and the holding shaft are stopped, the output shaft rotates at full speed, and with increasing speed of rotation of the control disk correspondingly slowing the rotation of the output shaft, wherein the means for selectively braking the control disk comprise:

(i) a housing having the holding shaft extending into an interior volume thereof;

(ii) a rotor mounted on the holding shaft for rotation therewith, and integrally connected to the control disk, the rotor mounting a series of peripheral rollers;

(iii) a flexible tube wrapped around the rotor in the housing so that the tube engages and is supported by the rollers, the tube defining inlet and outlet portions at its respective extremities;

(v) a fluid reservoir having the respective inlet and outlet portions of the tube in fluid flow communication therewith; and (vi) a flow control valve for selectively varying fluid flow through the tube;

whereby (A) when the flow control valve is open, fluid is flowed through the tube from the inlet portion to the outlet portion thereof and the rotor, control disk, and holding shaft rotate, to thereby decrease the rotation of the output shaft, (B) partial closing of the flow control valve reduces flow through the tube to slow rotation of the rotor, control disk, and holding shaft, and (C) when the flow control valve is fully closed, the rotor and control disk are prevented from rotating, such that when the control disk is stopped, the output shaft rotates at full speed, and the greater the open character of the flow control valve, the faster the control disk is rotated, thereby correspondingly slowing the rotation of the output shaft.

14. A variable speed transmission, comprising:

(a) a cylindrical drum rotatable about its central axis, said drum including planar first and second main circular faces, axially spaced apart from one another and joined to each other by a cylinderical peripheral wall, to form an enclosed interior volume in the drum;

(b) a first gear element mounted on an outer surface of the drum;

(c) a rotatable input shaft having a longitudinal axis parallel to the central axis of said drum;

(d) a gear mounted on the input shaft and engaging the first gear element (b) to effect rotation of the drum upon rotation of the input shaft;

(e) a holding shaft extending into the interior volume of the drum, and having a longitudinal axis coaxial with the central axis of the drum;

(f) a first sun gear mounted on said holding shaft in the interior volume of the drum;

(g) a planetary gear assembly mounted in the interior volume of the drum, comprising a first planet gear engaging the first sun gear, and a second planet gear axially spaced from the first planet gear and coaxially mounted therewith on a common shaft for integral rotation of the first and second planet gears with the common shaft;

(h) a rotatable output shaft extending into the interior volume of the drum opposedly to said holding shaft, and having a longitudinal axis coaxial with the central axis of the drum and colinear with the longitudinal axis of the holding shaft;

(i) a second sun gear mounted on the output shaft in the interior volume of the drum, in axial spaced relationship to the first sun gear, and engaging the second planet gear, with the second sun gear and the first sun gear being of differing size to provide a gearing ratio such that the output shaft rotates in an opposite direction of rotation to the drum;

a first selectively engageable shaft holding means for slowing the rotation of said holding shaft, said first selectively engageable shaft holding means comprising:

(j) means to selectively slow or stop the rotation of the holding shaft, such that when the holding shaft is stopped, the output shaft rotates in the direction opposite the rotation of the drum and rotates in the same direction as the input shaft, and when the holding shaft unimpededly rotates, the holding shaft rotates in a direction opposite the rotation of the input and in the same direction as the drum, and such that when the holding shaft is stopped, the output shaft rotates at full speed, and with increasing speed of rotation of the holding shaft correspondingly slowing the rotation of the output shaft; and a second selectively engageable shaft holding means for slowing the rotation of said holding shaft.

* * * * *